US012647013B2

(12) United States Patent
Ybanez et al.

(10) Patent No.: US 12,647,013 B2
(45) Date of Patent: Jun. 2, 2026

(54) COOLING ARCHITECTURE FOR A CRYOGENIC AND SUPERCONDUCTING POWERTRAIN USING LIQUID HYDROGEN ON BOARD AND METHOD FOR MANAGING THE COOLING TEMPERATURE OF THE POWERTRAIN COMPONENTS

(71) Applicant: Airbus SAS, Blagnac (FR)

(72) Inventors: Ludovic Ybanez, Blagnac (FR);
Souhaib Boukayoua, Blagnac (FR);
Matteo Tassisto, Blagnac (FR);
Swapnil Kharche, Blagnac (FR)

(73) Assignee: Airbus SAS, Blagnac (FR)

( * ) Notice: Subject to any disclaimer, the term of this patent is extended or adjusted under 35 U.S.C. 154(b) by 266 days.

(21) Appl. No.: 18/602,551

(22) Filed: Mar. 12, 2024

(65) Prior Publication Data

US 2024/0333120 A1     Oct. 3, 2024

Related U.S. Application Data

(60) Provisional application No. 63/492,371, filed on Mar. 27, 2023.

(51) Int. Cl.
| | |
|---|---|
| *H02K 55/00* | (2006.01) |
| *H01M 8/04007* | (2016.01) |
| *H01M 8/04082* | (2016.01) |
| *H02K 7/00* | (2006.01) |
| *H02K 9/10* | (2006.01) |
| *H02K 11/33* | (2016.01) |

(52) U.S. Cl.
CPC ........ *H02K 55/00* (2013.01); *H01M 8/04067* (2013.01); *H01M 8/04208* (2013.01); *H02K 7/003* (2013.01); *H02K 9/10* (2013.01); *H02K 11/33* (2016.01); *H01M 2250/20* (2013.01)

(58) Field of Classification Search
CPC ........ H02K 11/33; H02K 55/00; H02K 7/003; H02K 9/10; H01M 2250/20; H01M 8/04067; H01M 8/04208
See application file for complete search history.

(56) References Cited

U.S. PATENT DOCUMENTS

| | | | | |
|---|---|---|---|---|
| 9,493,090 | B2 * | 11/2016 | Timmons | B60L 50/51 |
| 11,264,811 | B2 * | 3/2022 | Partiwala | H01M 10/482 |
| 11,465,532 | B2 * | 10/2022 | Marius | H02J 7/0014 |
| 11,465,764 | B2 * | 10/2022 | Melack | B64D 27/357 |
| 11,909,005 | B2 * | 2/2024 | Despesse | H01M 50/298 |
| 12,291,111 | B2 * | 5/2025 | Harshe | B60L 1/02 |
| 2021/0107447 | A1 * | 4/2021 | Oh | B60W 10/26 |
| 2021/0155112 | A1 * | 5/2021 | Herring | B60L 50/16 |
| 2022/0055608 | A1 * | 2/2022 | Edman | B60W 10/08 |

(Continued)

*Primary Examiner* — Filip Zec
(74) *Attorney, Agent, or Firm* — Greer, Burns & Crain, Ltd.

(57) ABSTRACT

Cooling architecture for a cryogenic and superconducting powertrain using liquid hydrogen on board and method for managing the cooling temperature of the powertrain components. The cooling architecture comprises at least one heat exchanger configured to transfer heat from a first fluid to a second fluid. The first fluid of each heat exchanger may be liquid hydrogen ($H_2$), and the second fluid of each heat exchanger may be gaseous helium (He), liquid Neon or liquid Nitrogen ($N_2$).

15 Claims, 8 Drawing Sheets

(56)  References Cited

U.S. PATENT DOCUMENTS

| | | | |
|---|---|---|---|
| 2022/0161686 A1* | 5/2022 | Choi | H02K 9/19 |
| 2022/0203846 A1* | 6/2022 | Werner | H01M 8/083 |
| 2022/0271552 A1* | 8/2022 | Gibbs | H02J 7/007188 |
| 2023/0159176 A1* | 5/2023 | Taylor | H02K 7/14 |
| | | | 244/55 |

* cited by examiner determining the limiting parameters of each component of the cryogenic and superconducting powertrain calculating a flow and temperature of a fluid passing through the superconducting e-motor adjusting the flow and temperature of a fluid circulating through the whole cryogenic and superconducting powertrain

Fig. 6

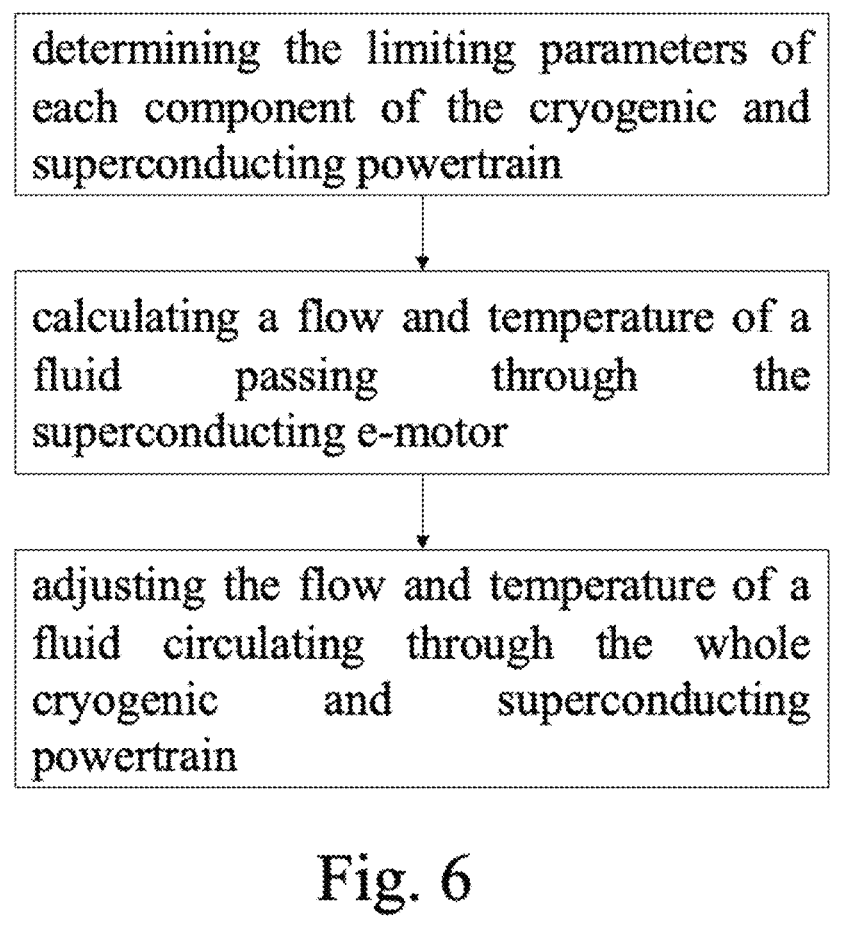

COOLING ARCHITECTURE FOR A CRYOGENIC AND SUPERCONDUCTING POWERTRAIN USING LIQUID HYDROGEN ON BOARD AND METHOD FOR MANAGING THE COOLING TEMPERATURE OF THE POWERTRAIN COMPONENTS

CROSS-REFERENCES TO RELATED APPLICATIONS

This application claims the benefit of U.S. Provisional Patent Application Ser. No. 63/492,371 filed on Mar. 27, 2023, the entire disclosure of which is incorporated herein by way of reference.

FIELD OF THE INVENTION

The present invention relates to a cryogenic and superconducting powertrain using liquid hydrogen and having a cooling architecture, and also to a method for managing a cooling temperature of powertrain components.

BACKGROUND OF THE INVENTION

Current cooling architectures for a cryogenic and superconducting powertrain are based on industrial cryocoolers specially made for ground applications. Cryocoolers made for ground applications cannot be used for aviation applications, since they do not have the cooling capacities necessary for aviation applications.

In addition, there are also major concerns related to the weight and efficiency of such cryocoolers for aviation applications.

On the other hand, liquid hydrogen ($LH_2$) available on-board can be used to cool-down the components of the powertrain. However, due to safety reasons, in aviation applications, $LH_2$ is not meant for direct use (i.e., for the direct cooling of electrical components).

In addition, the amount of $LH_2$ flowing from the $LH_2$ tank to the fuel cell system for a given flight phase is limited and, in general, driven by the fuel cell needs itself.

Therefore, an optimization of the cooling architecture is necessary in order to optimize the $LH_2$ consumption and to meet the cooling needs of the powertrain with the $LH_2$ flow available in a given flight phase.

A current cryogenic and superconducting powertrain comprises at least the following elements:

A Superconducting Motor,

A Motor Control Unit (MCU), arranged to control the functioning aspects of the Superconducting Motor, A Direct Current (DC) Line, Main Current Leads (CL) to the Fuel Cells, and A DC/DC Converter arranged to adapt the voltage levels between the DC Line and the Main Current Leads.

The different components of the cryogenic and superconducting powertrain have different cooling needs both in terms of maximum allowable temperature and maximum allowable temperature gradient across the components itself. In addition, the performances and the efficiency of the component itself depend on the temperature.

Table 1 summarizes the maximum allowable temperature and maximum allowable temperature gradient of the components in the cryogenic and superconducting powertrain:

TABLE 1

| Maximum allowable temperature and maximum allowable temperature gradient of the components in the cryogenic and superconducting powertrain | | |
|---|---|---|
| Component of the cryogenic and super-conducting powertrain | Maximum allowable temperature (Tmax) | Maximum allowable temperature gradient |
| Superconducting Motor | 40 K | / |
| Motor Control Unit (MCU) | 120 K | 20 K |
| DC Line | 75 K | / |
| DC/DC Converter | 140 K | 20 K |
| Main Current Leads | 150 K | / |

According to Table 1, if the superconducting motor is exposed to a temperature above 40K (its Tmax), a risk of quench within the superconducting motor appears. Moreover, the efficiency of the superconducting motor depends on the temperature: the superconducting motor has a better efficiency at lower temperature than its Tmax (i.e., lower than 40K).

The maximum allowable temperature gradient of the MCU (here 20K) shall not be exceeded to guarantee the proper operation of the MCU. Moreover, the efficiency of the MCU depends on the temperature: the MCU has a better efficiency at a lower temperature than its Tmax (i.e., lower than 120K).

If the DC line is exposed to a temperature above 75K (its Tmax), a risk of quench appears within the DC line.

The maximum allowable temperature gradient of the DC/DC Converter (here 20K) shall not be exceeded to guarantee the proper operation of the DC/DC Converter. Moreover, the efficiency of the DC/DC Converter depends on the temperature: the DC/DC Converter has a better efficiency at a lower temperature than its Tmax (i.e., lower than 140K).

The efficiency of the main Current Leads to the fuel cell depends on the temperature: the main Current Leads have a better efficiency at a lower temperature than its Tmax (i.e., lower than 150K).

Hence, all components of the cryogenic powertrain do not have the same cooling needs, and thus do not need to be cooled at the same temperature, since each component does not have the same maximum allowable temperature.

Thus, there is a need for a method and system for managing the cooling temperature of each component of the cryogenic and superconducting powertrain.

SUMMARY OF THE INVENTION

To this end, it is proposed a cryogenic and superconducting powertrain comprising:

at least a superconducting e-motor, including a motor shaft, at least a motor control unit configured to control all functioning aspects of the superconducting e-motor, a propeller lead by the superconducting e-motor, a gearbox, arranged between the superconducting e-motor and the propeller, and configured to control a rotating speed of the motor shaft, at least a superconducting distribution and protection device, at least a fuel cell, which comprises a DC power supply, main current leads to the fuel cell, at least a DC/DC converter to adapt voltage levels between the superconducting distribution and protection device and the main current leads, wherein the main current leads and the superconducting distribution and protection device have different working voltage levels,
a Thermal Management System (TMS) for managing the temperature of the fuel cell, and,
a cooling architecture comprising:
 a liquid hydrogen (LH$_2$) tank for LH$_2$ storage at cryogenic temperature,
 LH$_2$ circulation pipes starting and ending at the LH$_2$ tank,
 a first heat exchanger configured to exchange heat between a first fluid and a second fluid,
 a first cryostat of second fluid for cooling the motor control unit and the superconducting e-motor,
 a second cryostat of second fluid for cooling the DC/DC converter, and
 second fluid circulation pipes, starting and ending at each cryostat.

According to an embodiment of the invention, the first fluid comprises LH$_2$ and the second fluid comprises gaseous helium (GHe).

According to an embodiment of the invention, the cooling architecture comprises a primary cooling loop for the first fluid and a secondary cooling loop for the second fluid.

According to an embodiment of the invention, the secondary cooling loop is arranged and configured to cool down the cryogenic and superconducting powertrain components.

According to an embodiment of the invention, the secondary cooling loop is cooled by LH$_2$ flow, and in return heats the LH$_2$ that will enter in the fuel cell.

According to an embodiment of the invention, the cryogenic and superconducting powertrain further comprising:
 a cryogenic recirculation fan in order to recirculate the second fluid into the cryogenic and superconducting powertrain components in a complete closed loop, and
 cryogenic insulated lines, in order to convey the cryogenic fluid to the electrical components of the cryogenic and superconducting powertrain.

According to an embodiment of the invention, the cooling architecture further comprises a second heat exchanger configured to exchange heat between the first fluid and the second fluid.

According to an embodiment of the invention, the cooling architecture further comprises a third heat exchanger configured to exchange heat between the first fluid and a third fluid, the third fluid being a coolant of the Thermal Management System.

According to an embodiment of the invention, the cooling architecture further comprises a third cryostat of second fluid for cooling the third heat exchanger.

According to an embodiment of the invention, the third heat exchanger is configured to exchange heat between the first fluid of the first heat exchanger and the third fluid, and the cooling architecture further comprises a fourth heat exchanger configured to exchange heat between the first fluid of the second heat exchanger and the third fluid.

According to an embodiment of the invention, the cooling architecture further comprises a fourth cryostat of second fluid for cooling the third heat exchanger.

According to an embodiment of the invention, the cooling architecture further comprises a fifth cryostat of second fluid for cooling the cryogenic recirculation fan and the heat exchanger.

According to an embodiment of the invention, the second cryostat of second fluid is further arranged for cooling the main current leads.

According to an embodiment of the invention, the cooling architecture further comprises a sixth cryostat of second fluid for cooling the superconducting distribution and protection device.

It is also proposed a method for managing a cooling temperature of cryogenic and superconducting powertrain components of the cryogenic and superconducting powertrain components of the invention, comprising the steps of:
 determining limiting parameters of each component of the cryogenic and superconducting powertrain, said limiting parameters being a maximum allowable temperature and/or a maximum temperature gradient of each component of the cryogenic and superconducting powertrain,
 calculating a flow and temperature of a fluid passing through the superconducting e-motor which is necessary to respect the limiting parameters of the superconducting e-motor, and
 adjusting the flow and temperature of a fluid circulating through the whole cryogenic and superconducting powertrain which is necessary to respect the other limiting parameters, knowing the flow and temperature of said fluid through the superconducting e-motor.

BRIEF DESCRIPTION OF THE DRAWINGS

The characteristics of the invention mentioned above, as well as others, will appear more clearly on reading the following description of at least one embodiment, said description being made in relation to the attached drawings, among which:

FIG. 6 schematically illustrates a method for managing a cooling temperature of powertrain components.

DETAILED DESCRIPTION OF THE PREFERRED EMBODIMENTS

Figure 1:
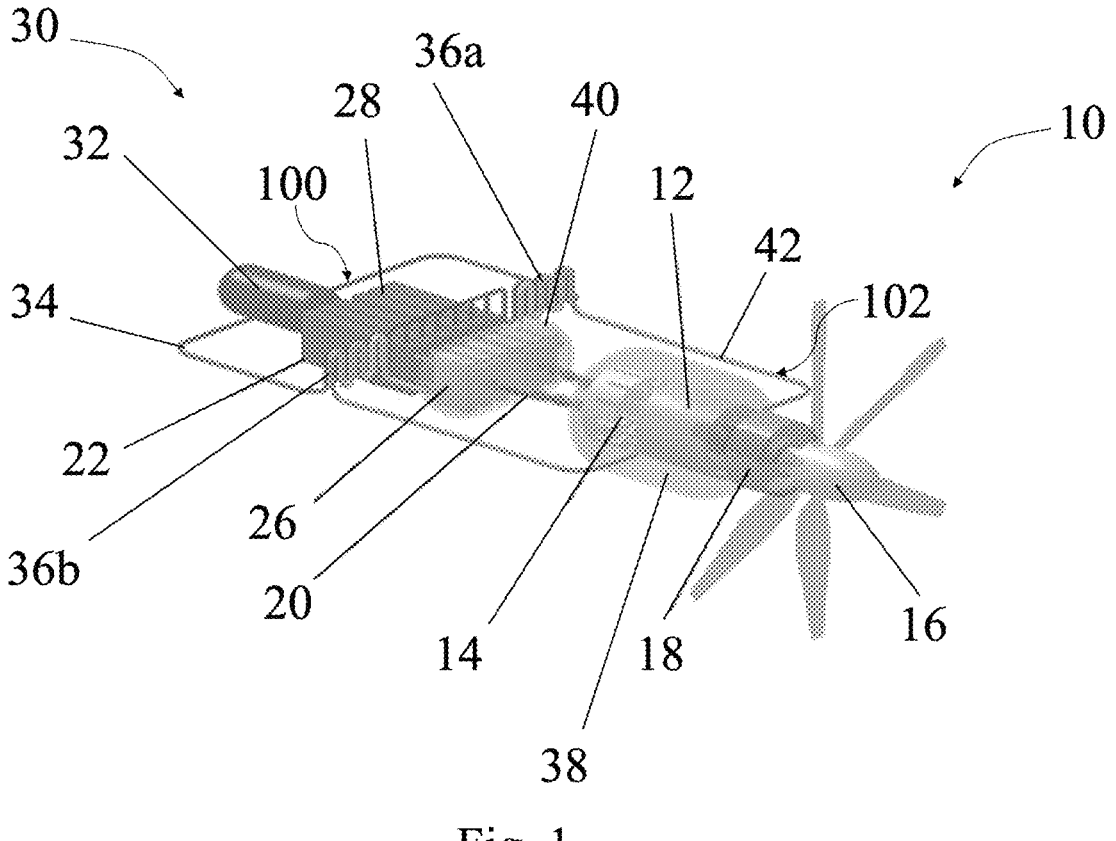
FIG. 1 schematically illustrates a cooling architecture for a cryogenic and superconducting powertrain operating at cryogenic temperature according to an embodiment of the invention.

FIG. 1 represents a cooling architecture for a cryogenic and superconducting powertrain (including a Superconducting Motor, Motor Control Units, a Superconducting distribution and protection and the cryogenic DC/DC conversion) operating at cryogenic temperature.

The cryogenic and superconducting powertrain 10 comprises:

A superconducting e-motor 12, including a motor shaft,

A motor control unit (MCU) 14 configured to control all the functioning aspects of the superconducting e-motor 12, A propeller 16, lead by the superconducting e-motor 12, A gearbox 18, arranged between the superconducting e-motor 12 and the propeller 16, and configured to control the rotating speed of the motor shaft, Superconducting distribution and protection devices 20, also called DC cables 20 or DC Line 20, At least a fuel cell 22, which in this architecture is used as a source of DC power supply, Main current leads 24 to the fuel cell 22, (cryogenic) DC/DC converters 26 to adapt the voltage levels between the DC cables 20 and the main current leads 24, since in this architecture, the main current leads 24 and the DC cables 20 are working at different voltage levels, and A Thermal Management System (TMS) 28 for managing the temperature of the fuel cell 22.

In this cryogenic and superconducting powertrain 10, a reduction ratio of speed is applied using the gearbox 18.

The cooling architecture 30 comprises:

A $LH_2$ tank 32 for $LH_2$ storage at cryogenic temperature, $LH_2$ circulation pipes 34 starting and ending at the $LH_2$ tank 32, At least one heat exchanger 36, 36a, 36b (first and second heat exchangers in FIG. 1), between a first fluid (here $LH_2$) and a second fluid (here gaseous helium, GHe), A cryostat 38 of second fluid for cooling the MCU 14 and the superconducting e-motor 12, A cryostat 40 of second fluid for cooling the DC/DC converters 26, and Second fluid circulation pipes 42, starting and ending at each cryostat 38, 40.

Thus, the cooling architecture 30 comprises a primary cooling loop 100 for $LH_2$ and a secondary cooling loop 102 for GHe. The secondary cooling loop 102 is arranged and configured to cool down the powertrain components. The secondary cooling loop 102 is cooled by $LH_2$ flow, and in return heats the $LH_2$ that will enter in the fuel cell 22.

As represented in FIG. 1, the cooling architecture 30 comprises a first heat exchanger 36a and a second heat exchanger 36b. Each heat exchanger 36a, 36b is configured to transfer heat from a first fluid to a second fluid. In the following description, in a non-limitative way, the first fluid of each heat exchanger 36a, 36b is liquid hydrogen ($H_2$), and the second fluid of each heat exchanger 36a, 36b is gaseous helium (He).

The second fluid of the heat exchangers 36a, 36b may be another inert fluid than helium, for instance liquid Neon or liquid Nitrogen (N2).

Preferably, gaseous helium is used in the secondary cooling loop 102, since it is less expensive than Neon, and it is an inert element, reducing the safety risk significantly compared to H2, and is lightweight. Moreover, helium is the only element with a boiling point lower than H2, so it will be in its gaseous phase in all the possible aircraft scenarios. This simplifies the global cooling architecture 30 for the cryogenic and superconducting powertrain 10, since no compressors and/or buffers need to be introduced in the architecture (which have an impact on the global weight of the cooling architecture and its reliability).

The cooling architecture 30 also comprises:

A cryogenic recirculation fan 44 (not represented in FIG. 1, but visible in FIGS. 2-4 and 5C) in order to recirculate the helium coolant into the powertrain components in a complete closed loop, and Cryogenic insulated lines 54a-k in order to convey the cryogenic fluid to the electrical components of the powertrain 10.

According to the invention, $LH_2$ is used for cooling the cryogenic and superconducting powertrain 10. This allows to facilitate the subsequent conditioning of H2 (before injection into the fuel cell 22), since H2 rejected by the cooling architecture 30 of the cryogenic and superconducting powertrain 10 will be at an intermediate temperature between the boil temperature (20K at atmospheric pressure) and the injection temperature (around 300K) into the fuel cells 22, reducing the needs in terms of electrical heaters for H2 conditioning.

As an example, Table 2 represents the operations at maximum power for a typical 1.1 MW cryogenic and superconducting powertrain 10:

TABLE 2

| Dissipation of each component of the cryogenic and superconducting powertrain 10. | |
| --- | --- |
| Components | Dissipation |
| Superconducting Motor 12 | 3100 W |
| Motor Control Unit 14 (two in the powertrain 10) | 4800 W each |
| Superconducting distribution 20 (two in the powertrain 10) | 30 W each |
| DC/DC converter 26 (two in the powertrain 10) | 5400 W each |
| Current Leads 24 to Fuel Cells 22 (eight in the powertrain 10) | 100 W each |
| Cryofan 44 | 500 W |
| Cryolines/cryostats | 100 W |

According to Table 2, the superconducting motor 12 is dissipating 3100 W in use of the superconducting and cryogenic powertrain 10. Such dissipation is advantageously extracted with the fluids (more precisely with helium cooled by H2) flowing through the superconducting motor 12. Helium, firstly cooled by H2, is warmed up by the heat dissipating from the superconducting motor 12, allowing the superconducting motor 12 to stay at its stable working temperature, even if the superconducting motor 12 dissipates 3100 W. The same principle applies to all components of the powertrain 10.

Figure 2:
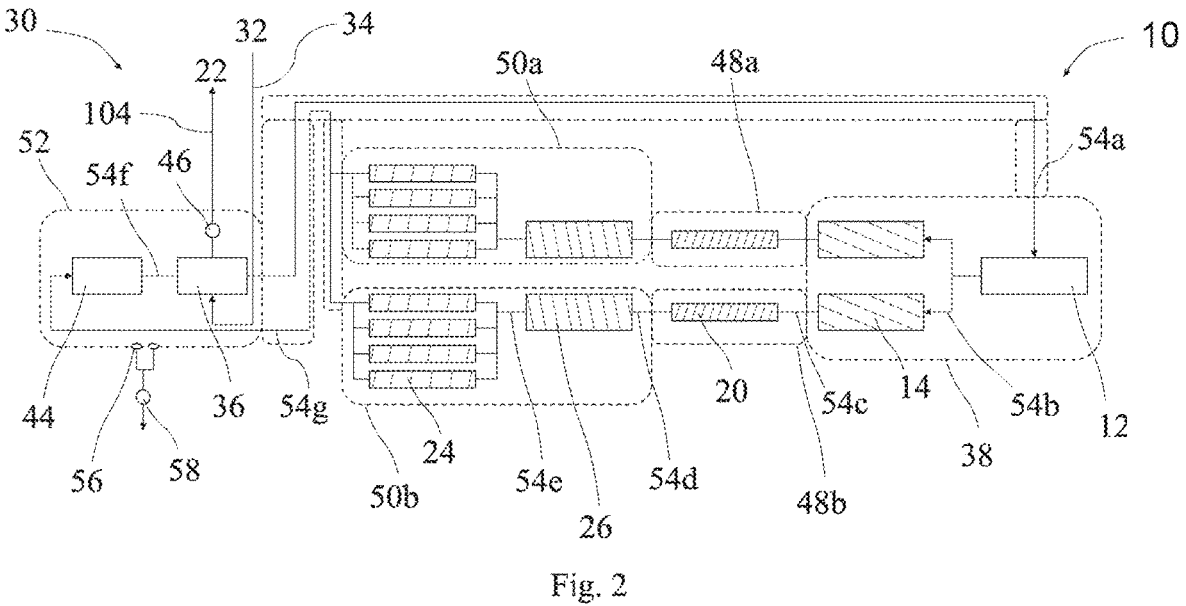
FIG. 2 schematically illustrates a cooling architecture of a cryogenic and superconducting powertrain operating at cryogenic temperature according to another embodiment of the invention.

Cooling Architecture with One Heat Exchanger;

FIG. 2 represents a cooling architecture 30 of a cryogenic and superconducting powertrain 10 in which all components of the powertrain 10 are cooled in series, in order to minimize the impact of the cooling lines. As shown in FIG. 2 dotted boxes indicate a dedicated cryostat for the respective components which need to be maintained at low temperatures. As mentioned previously, the superconducting motor 12 and the MCUs are arranged in the same cryostat 38. Each superconducting distribution and protection device 20 is arranged in a dedicated cryostat 48a, 48b. The current leads 24 and a DC/DC converter 26 are arranged in a common cryostat 50a, 50b. More precisely, as represented in FIG. 2, current leads 24 and the DC/DC converters 26 of the powertrain 10 are divided into two electric lines, each electric line of the current leads 24 and a DC/DC converter 26 is arranged in a dedicated cryostat 50*a*, 50*b*. The cryogenic fan 44 and the heat exchanger 36 are also arranged in a common cryostat 52.

In the cooling architecture of FIG. 2, only one heat exchanger 36 is arranged to transfer heat between H2 and helium.

In FIG. 2, the temperature of H2 at the H2 inlet of the heat exchanger 36 (i.e. on the cryogenic insulated line of $LH_2$ 34 coming from the $LH_2$ tank 32) may be between 10K and 30K (here around 21K), the temperature of H2 at the H2 outlet of the heat exchanger 36 (i.e., on the $LH_2$ line 104 in direction to the fuel cells 22) may be between 60K and 80K (here around 68K), and the flow of H2 may be between 20 g/s and 40 g/s (here around 27.1 g/s).

The flow of helium may be between 90 g/s and 115 g/s (here around 103 g/s). The temperature of helium between the cryogenic fan 44 and the input of the heat exchanger 36 (on the cryogenic insulated line 54*f*) may be between 60K and 80K (here around 70K). The temperature of helium between the output of the heat exchanger 36 and the superconducting motor 12 (on the cryogenic insulated line 54*a*) may be between 10K and 30K (here around 23K). The temperature of helium between the superconducting motor 12 and the MCUs 14 (on the cryogenic insulated line 54*b*) may be between 20K and 40K (here around 29K). The temperature of helium between the DC distribution 20 and the MCU 14 (on the cryogenic insulated line 54*c*) may be between 35K and 55K (here around 46K). The temperature of helium between the DC/DC converter 26 and the DC distribution 20 (on the cryogenic insulated line 54*d*) may be between 40K and 60K (here around 47K). The temperature of helium between the current leads 24 and the DC/DC converter 26 (on the cryogenic insulated line 54*e*) may be between 55K and 75K (here around 67K). Helium is then transmitted from the current leads 24 to the cryogenic fan 44 through the cryogenic insulated line 54*g*.

According to this embodiment of the invention, in the cooling architecture 30 of the cryogenic and superconducting powertrain 10 represented in FIG. 2, a predetermined amount of second fluid is cooled at a predetermined temperature, using the first fluid, before being injected in the superconducting motor 12 of the powertrain 10. For example, helium (He) is cooled at a temperature around 23K by hydrogen (H2). The amount of second fluid to be cooled is calculated depending on the constraints coming from the powertrain 10. For example, the flow of He circulating from the heat exchanger 36 to the superconducting motor 12 is around 103 g/s.

In the architecture represented in FIG. 2, the main constraint is the maximum temperature gradient allowed by the DC/DC converter 26 (here 20K). In order to respect a maximum temperature gradient for the DC/DC converter 26 of 20K, the flow of He circulating through the whole powertrain 10, and thus through the DC/DC converter 26, is around 103 g/s.

The temperature increase of He through a powertrain component, assuming that helium is absorbing all the power dissipated by said powertrain component, is calculated according to the following equation:

$$dT = \frac{Q}{mdot \times cp} \qquad \text{[EQ. 1]}$$

with dT the temperature increase of helium,
with Q the dissipation of the powertrain component, with mdot the mass flow of helium, and
with cp the specific heat capacity of helium.

In the architecture represented in FIG. 2, another major constraint is the inlet temperature of the superconducting motor 12, that needs to be kept as low as possible.

Taking into account that the flow of helium entering into the powertrain 10 is 103 g/s, and knowing the dissipation of each component of the powertrain 10 (see Table 2), the temperature at each point of the cooling architecture 30 is calculated accordingly.

In a summary, according to the invention, and as represented in FIG. 6, a method for managing the cooling temperature of the powertrain components comprises the steps of:

determining the limiting parameters of each component of the powertrain 10, said limiting parameters being the maximum allowable temperature and/or the maximum temperature gradient of each component of the powertrain 10, calculating the flow and temperature of the fluid (here helium) passing through the superconducting motor 12 which is necessary to respect the limiting parameters of the superconducting motor 12, and adjusting the flow and temperature of the fluid (here helium) circulating through the whole powertrain 10 which is necessary to respect the other limiting parameters, knowing the flow and temperature of said fluid through the superconducting motor 12.

The limiting parameters of the powertrain components are determined based on the technical features of said components. Tests can be realized to determine such limiting parameters.

Other limiting parameters than the maximum allowable temperature and/or the maximum temperature gradient of each component of the powertrain 10 can be determined.

The superconducting motor 12 is the powertrain component having the most limiting of the limiting parameters. Thus, first flow and temperature for helium are calculated taking into account the limiting parameters of the superconducting motor 12. Then, for each component of the powertrain 10, taking into account its limiting parameters, second flow and temperature for helium are calculated. The second flow and temperature of helium are compared to the first flow and temperature of helium calculated for the superconducting motor 12 of the powertrain 10. If the second flow of helium is lower than the first flow of helium that has been calculated for the superconducting motor 12, the first flow of helium is selected, and no adjustment of flow of helium is realized. If the second flow of helium is higher than the first flow of helium that has been calculated for the superconducting motor 12, the second flow of helium is selected so that the flow of helium is adjusted. If the second temperature of helium is higher than the first temperature of helium that has been calculated for the superconducting motor 12, the first temperature of helium is selected, and no adjustment of temperature of helium is realized. If the second temperature of helium is lower than the first temperature of helium that has been calculated for the superconducting motor 12, the second temperature of helium is selected so that the temperature of helium is adjusted.

According to the invention, in order to respect all limiting constraints of each powertrain component, the flow and temperature of helium finally selected correspond to the flow and temperature of helium the most limiting for the cooling architecture 30. Generally, the lower temperature of helium, either firstly calculated or adjusted, is selected for the cooling architecture 30; and the higher flow of helium, either firstly calculated or adjusted, is selected for the cooling architecture 30.

According to the invention, $LH_2$ at around 20K (21K in FIG. 2) stored in a pressurized tank 32 is used as a cooling source. A working fluid of gaseous helium (GHe) is used in a closed circuit to cool-down the electrical components of the cryogenic and superconducting powertrain 10. The flow of GHe in the closed circuit is regulated by a circulation fan 44 (also called cryofan or cryogenic fan). This flow of GHe is also regulated based on the cooling power requirements of the powertrain 10. In FIG. 2, one $GHe/LH_2$ heat exchanger 36 is used.

$LH_2$ enters at around 20K in the heat exchanger 36 from the $LH_2$ tank 32. In the heat exchanger 36, warm GHe (around 70K) is cooled down to around 20K (23K in FIG. 2) by $LH_2$. Cold GHe is then used to maintain the superconducting motor 12, the Motor Control Unit 14 (MCU), the DC/DC converter 26 and the main current leads 24 (CL) to the Fuel Cell 22 (FC) at the desired low temperature.

GHe coming out from the superconducting motor 12 may also be used to cool-down the Direct Current (DC) line 20 and other components of the powertrain 10.

Warm GHe out of the current leads 24 is then fed back to the heat exchanger 36 through the return line 54g with the help of the cryofan 44.

This cooling architecture 30 also comprises remote control valves 46 to regulate the flow in different components. For instance, in FIG. 2, a valve 46 is arranged on the $LH_2$ line 104. The cryostat 52 housing the cryogenic fan 44 and the heat exchanger 36 is equipped with rupture disks 56 and a non-return valve with spring 58 to allow an evacuation of the fluid of the cryostat 52. The functioning of the valves is not detailed here.

For instance, GHe entering the superconducting motor 12 is at a first temperature between 15K and 30K (here around 23K), GHe is warmed by the superconducting motor 12 up to a second temperature between 20K and 35K (here around 29K), due to the dissipation of the superconducting motor 12. GHe then enters to the MCU 14, and is warmed by the MCU 14 to a third temperature between 35K and 55K (here around 46K), due to the dissipation of the MCU 14. GHe then enters to the DC line 20, and is warmed by the DC line 20 to a fourth temperature between 40K and 55K (here around 47K), due to the dissipation of the DC line 20. GHe then enters to the DC/DC converter 26, and is warmed by the DC/DC converter 26 to a fifth temperature between 55K and 75K (here around 67K), due to the dissipation of the DC/DC converter 26. Then, GHe enters to the current leads 24 to the fuel cell 22, and is warmed by said current leads 24, due to the dissipation of said current leads 24, before being cooled by the cryogenic fan 44 to a temperature between 60K and 80K (here around 70K). GHe then passes through the heat exchanger 36 to be cooled, thanks to LH2, to the first temperature.

According to Table 1, none of the powertrain components is subjected to a temperature above its maximum allowable temperature.

As regards to Table 2, since the MCU 14 and the DC/DC converter 26 have a higher dissipation than the other components of the powertrain 10, the rise of temperature of GHe is higher through the MCU 14 and the DC/DC converter 26 (a rise of temperature above 15K) than through other components of the powertrain 10 (a rise of temperature below 10K).

In order to reduce the overall consumption of $LH_2$, the cooling architecture 30 preferably comprises two heat exchangers He/H2 36a, 36b.

Figure 3:
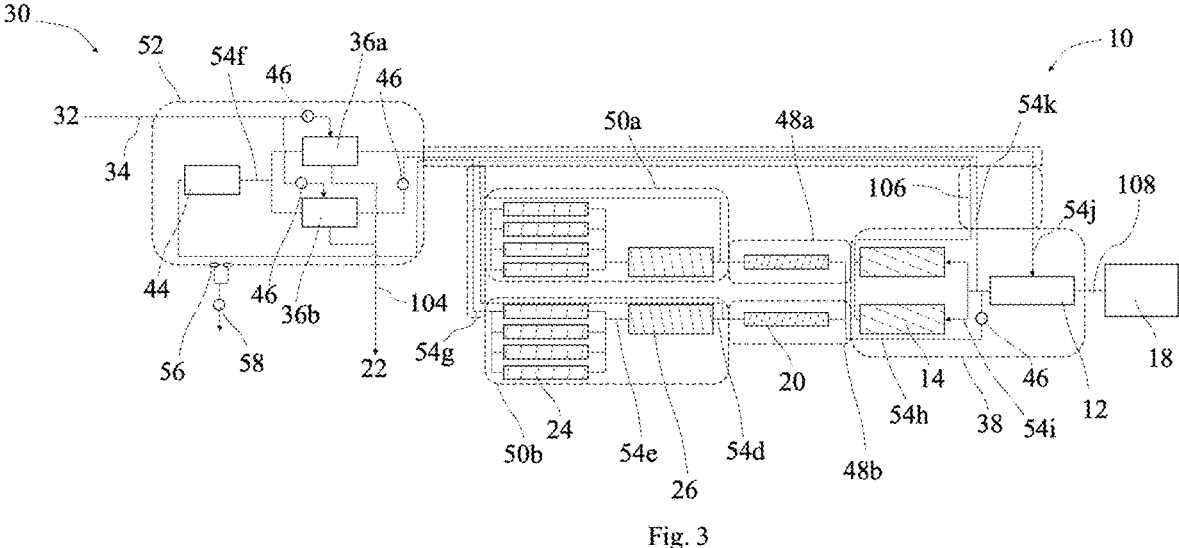
FIG. 3 schematically illustrates a cooling architecture of a cryogenic and superconducting powertrain operating at cryogenic temperature according to another embodiment of the invention.

Cooling Architecture with Two Heat Exchangers:

In FIG. 3, the cooling architecture 30 of a cryogenic powertrain 10 is presented for a single superconducting motor 12 with two channels. A single channel configuration refers to the cryogenic powertrain 10 with one superconducting electric motor 12 coupled with a single Motor Control Unit 14 (MCU), Direct Current (DC) cable 20, DC/DC converter 26 and current leads 24 to the fuel cell 22.

In FIG. 3, the temperature of H2 at the H2 inlet (from the $LH_2$ tank 32, on the $LH_2$ line 34) may be between 15K and 30K (here around 21K), the temperature of H2 at the H2 outlet (on the $LH_2$ line 104 in direction to the fuel cell 22) may be between 125K and 140K (here around 132K), and the flow of H2 may be between 10 g/s and 20 g/s (here around 15.3 g/s).

The flow of helium may be between 65 g/s and 85 g/s (here around 76 g/s). The temperature of helium between the cryogenic fan 44 and the heat exchangers 36a, 36b (on the cryogenic insulated line 54f) may be between 120K and 140K (here around 130K). The temperature of helium between the first heat exchanger 36a and the superconducting motor 12 (on the cryogenic insulated line 54j) may be between 10K and 30K (here around 23K). The temperature of helium between the second heat exchanger 36b and the MCU 14 (at the connection side of the superconducting motor 12 with the MCU 14, on the cryogenic insulated line 54k) may be between 90K and 120K (here around 105K). The temperature of helium between MCUs 14 (on the cryogenic insulated line 54i) may be between 80K and 100K (here around 90K). The temperature of helium between the DC distribution 20 and the MCU 14 (at the connection side of the superconducting motor 12 with the MCU 14, on the cryogenic insulated line 54h) may be between 35K and 55K (here around 45K). The MCUs 14 are connected between the DC line 20 and the DC/DC converter 26 through the cryogenic insulated line 106. The temperature of helium at the output of the DC/DC converter 26 (on the cryogenic insulated line 54d arranged between the DC/DC converter 26 and the DC line 20) may be between 100K and 120K (here around 110K). The temperature of helium between the cryogenic fan 44 and the current leads 24 (on the cryogenic insulated line 54g) may be between 122K and 142K (here around 128K).

According to this embodiment of the invention, in the cooling architecture 30 of the cryogenic and superconducting powertrain 10 represented in FIG. 3, a predetermined amount of second fluid is cooled at a predetermined temperature, using the first fluid, before being injected in the superconducting motor 12 of the powertrain 10. For example, helium (He) is cooled at a temperature around 23K by hydrogen (H2). The amount of second fluid to be cooled is calculated depending on the constraints coming from the powertrain. For example, the flow of He circulating from the heat exchanger 36a, 36b to the superconducting motor 12 is around 76 g/s.

In the architecture represented in FIG. 3, the main constraint is the maximum temperature gradient allowed by the DC/DC converter 26 (here 20K). In order to respect a maximum temperature gradient for the DC/DC converter 26 of 20K, the flow of He circulating through the whole powertrain 10, and thus through the DC/DC converter 26, is around 76 g/s.

In the architecture represented in FIG. 3, another major constraint is the inlet temperature of the superconducting motor 12, that needs to be kept as low as possible.

Taking into account that the flow of helium entering into the powertrain is 76 g/s, and knowing the dissipation of each component of the powertrain 10 (see Table 2), the temperature at each point of the cooling architecture 30 is calculated accordingly.

According to the invention, $LH_2$ at around 20K (at 21K in FIG. 3) stored in a pressurized tank 32 is used as a cooling source. A working fluid of gaseous helium (GHe) is used in a closed circuit to cool-down the electrical components of the cryogenic and superconducting powertrain 10. The flow of GHe in the closed circuit is regulated by the cryogenic fan 44. The flow of GHe is also regulated based on the cooling power requirements of the powertrain 10. Here, two separate $GHe/LH_2$ heat exchangers 36a, 36b are used, because for the superconducting motor 12, a low mass flow rate is needed, with much lower temperature inlet (about 20K, 23K in FIG. 3), whereas for the motor control unit 14 and DC/DC converter 26, high flow rate at comparatively higher temperature inlet (about 100K) is needed.

$LH_2$ enters at around 20K in both the heat exchangers 36a, 36b. In the first heat exchanger 36a, warm GHe around 150K (130K in FIG. 3) is cooled down to around 20K (23K in FIG. 3) by $LH_2$. Cold GHe is then used to maintain the superconducting motor 12 at the desired low temperature.

GHe coming out from the superconducting motor 12 may also be used to cool-down the Direct Current (DC) line 20 and other components of the powertrain 10 (as represented in FIG. 3).

In the second heat exchanger 36b, warm GHe around 150K is cooled down to 115K (105K in FIG. 3) by $LH_2$. Cold GHe is then used to maintain the Motor Control Unit 14 (MCU), DC/DC converter 26 and the main current leads 24 (CL) to the Fuel Cell 22 (FC) at the required cold temperature. Warm GHe out of current leads 24 is then fed back to the heat exchangers 36a, 36b through the return line 54g with the help of the cryofan 44. This cooling architecture 30 comprises remote control valves 46 to regulate the flow in different components. For instance, in FIG. 3, valves 46 are arranged on each $LH_2$ line 34 to the heat exchanger 36a, 36b, on the cryogenic insulated lines 54k, 54h. The functioning of the valves is not detailed here.

For instance, GHe coming from the first heat exchanger 36a and entering the superconducting motor 12 is at a first temperature between 20K and 30K (here around 23K), GHe is warmed by the superconducting motor 12 up to a second temperature between 30K and 55K (here around 45K), due to the dissipation of the superconducting motor 12. GHe coming out from the superconducting motor 12 enters to the DC line 20, and is warmed by the DC line 20, due to the dissipation of the DC line 20. GHe coming from the MCU 14 and from the DC line 20 enters to the DC/DC converter 26 at a temperature between 100K and 120K (here around 110K), and is warmed by the DC/DC converter 26, due to the dissipation of the DC/DC converter 26. GHe coming from the second heat exchanger 36b is at a temperature between 95K and 115K (here around 105K). GHe coming out from the superconducting motor 12 (here around 45K) is melted with GHe coming from the second heat exchanger 36b (here around 105K) before entering the MCU 14. Thus, GHe enters to the MCU 14 at a temperature between 80K and 100K (here around 90K), and is warmed by the MCU 14, due to the dissipation of the MCU 14. Then, GHe enters to the current leads 24 to the fuel cell 22, and is warmed by said current leads 24 up to a temperature between 120K and 140K (here around 128K), due to the dissipation of said current leads 24. Then, GHe passes through the cryogenic fan 44, and through the heat exchangers 36a, 36b to be cooled from a temperature between 120K and 140K (here around 130K), thanks to $LH_2$, to the first temperature.

According to Table 1, none of the powertrain components is subjected to a temperature above its maximum allowable temperature.

As regard to Table 2, since the MCU 14 and the DC/DC converter 26 have a higher dissipation than the other components of the powertrain 10, the rise of temperature of GHe is higher through the MCU 14 and the DC/DC converter 26 than through other components of the powertrain 10.

The cryogenic fan 44 and the heat exchangers 36a, 36b are arranged in a common cryostat 52. Preferably, the heat exchangers 36a, 36b are arranged in a cryostat 52, near to the fuel cell 22, to reduce the weight of the cooling architecture 30. Generally, this cryostat 52 and fuel cell 22 are arranged close to each other, for instance at one or two meters one from the other.

With the above cooling architecture 30, various configurations of the cryogenic and superconducting powertrain 10 are possible.

Figure 4:
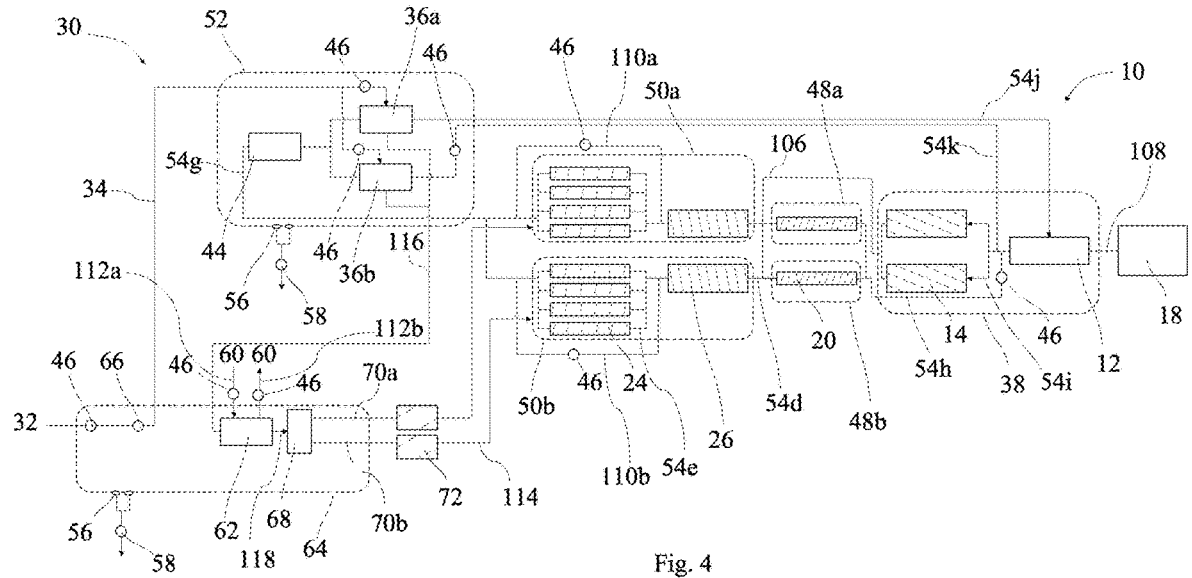
FIG. 4 schematically illustrates a cooling architecture of a cryogenic and superconducting powertrain operating at cryogenic temperature according to another embodiment of the invention.

First Configuration of the Cryogenic and Superconducting Powertrain:

In a first configuration, FIG. 4 shows a powertrain 10 comprising a single superconducting motor 12 with two separate electrical channels. Here, two channels are used in order to omit the electrical dependency on a single channel. Thus, even with a failure of a single electrical channel, the powertrain 10 would be able to work, in a degraded mode.

A gearbox 18 is used to control the rotating speed of the motor shaft, through the electric line 108. In this architecture, a reduction ratio of speed will be applied using a gearbox 18.

A motor control unit 14 is required to control all the functioning aspects of the superconducting motor 12. A DC/DC converter 26 is used because the main current leads 24 and the DC cables 20 are working at different voltage levels. Fuel cells 22 in this architecture are used as a source of DC power supply.

According to this configuration, the superconducting motor 12 and the two MCUs 14 are arranged in a common cryostat 38. Each DC line 20 is arranged in a distinct cryostat 48a, 48b. The DC/DC converter 26 and the main currents leads 24 to the fuel cell 22 of the first electrical channel are arranged in a common cryostat 50a. The DC/DC converter 26 and the main currents leads 24 to the fuel cell 22 of the second electrical channel are arranged in a common cryostat 50b. The two heat exchangers 36a, 36b and the cryofan 44 are arranged in a common cryostat 52.

In this configuration of the powertrain 10, cold H2 is firstly used to cool helium, through first and second heat exchangers 36a, 36b, and then H2 at an intermediate temperature (on the H2 line 116) is used to cool the Thermal Management System (TMS) 60 coolant, with another heat exchanger 62 arranged in a "cold" box 64 (another cryostat).

Warm H2 is then used to feed the fuel cell 22. Warm H2 passes from the heat exchanger 62 (via a H2 line 118) through a manifold 68 to be divided into two H2 lines 70a, 70b. Each H2 line 70a, 70b is equipped with a PGM 72, and then connected to the fuel cells 22 through the H2 line 114.

Each main current leads 24 to the fuel cells 22 can be bypassed, through the bypass lines 110a, 110b.

This cooling architecture 30 also comprises remote control valves 46 to regulate the flow in different components. For instance, in FIG. 4, a valve 46 is arranged on the $LH_2$ line 34, and on each LH$_2$ line 34 to the heat exchanger 36$a$, 36$b$, on the cryogenic insulated lines 54$k$, 54$h$, on the bypass lines 110$a$, 110$b$ of the main current leads 24, on the coolant lines 112$a$, 112$b$ from and to the TMS 60. The cryostat 64 housing the heat exchanger 62 is equipped with rupture disks 56 and a non-return valve with spring 58 to allow an evacuation of the fluid of the cryostat 64. A throttle valve 66 is arranged on the cryogenic insulated line 34 coming from the H$_2$ tank 32 to the heat exchangers 36$a$, 36$b$.

Figure 5A:
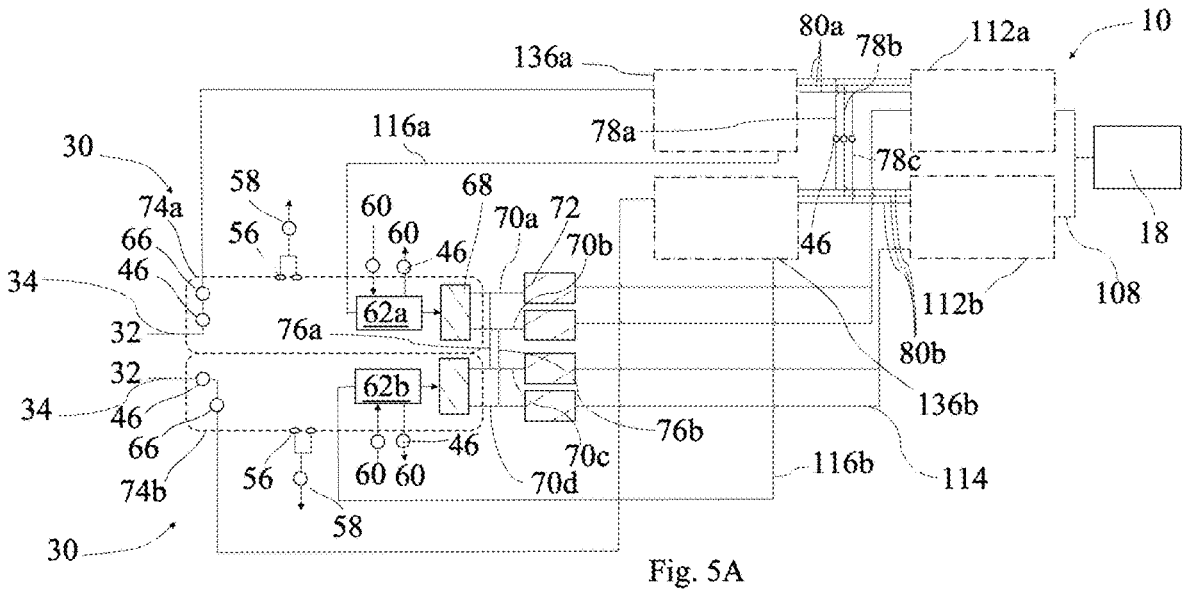
FIG. 5A schematically illustrates a cooling architecture of a cryogenic and superconducting powertrain operating at cryogenic temperature according to another embodiment of the invention.
Figure 5B:
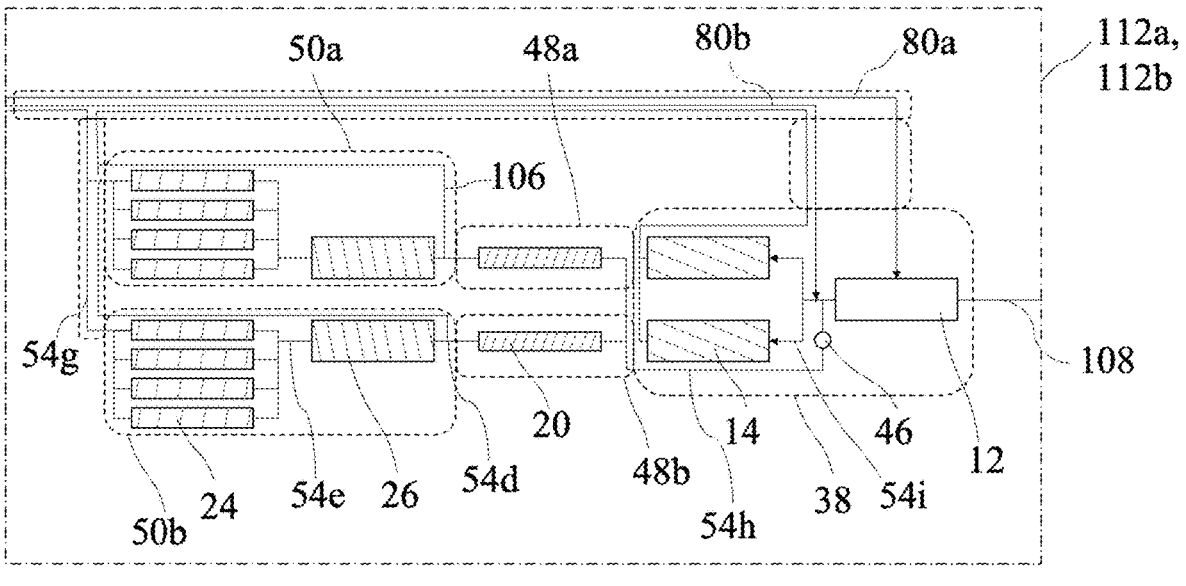
FIG. 5B schematically illustrates a part of the cooling architecture of the cryogenic and superconducting powertrain operating at cryogenic temperature according to FIG. 5A.
Figure 5C:
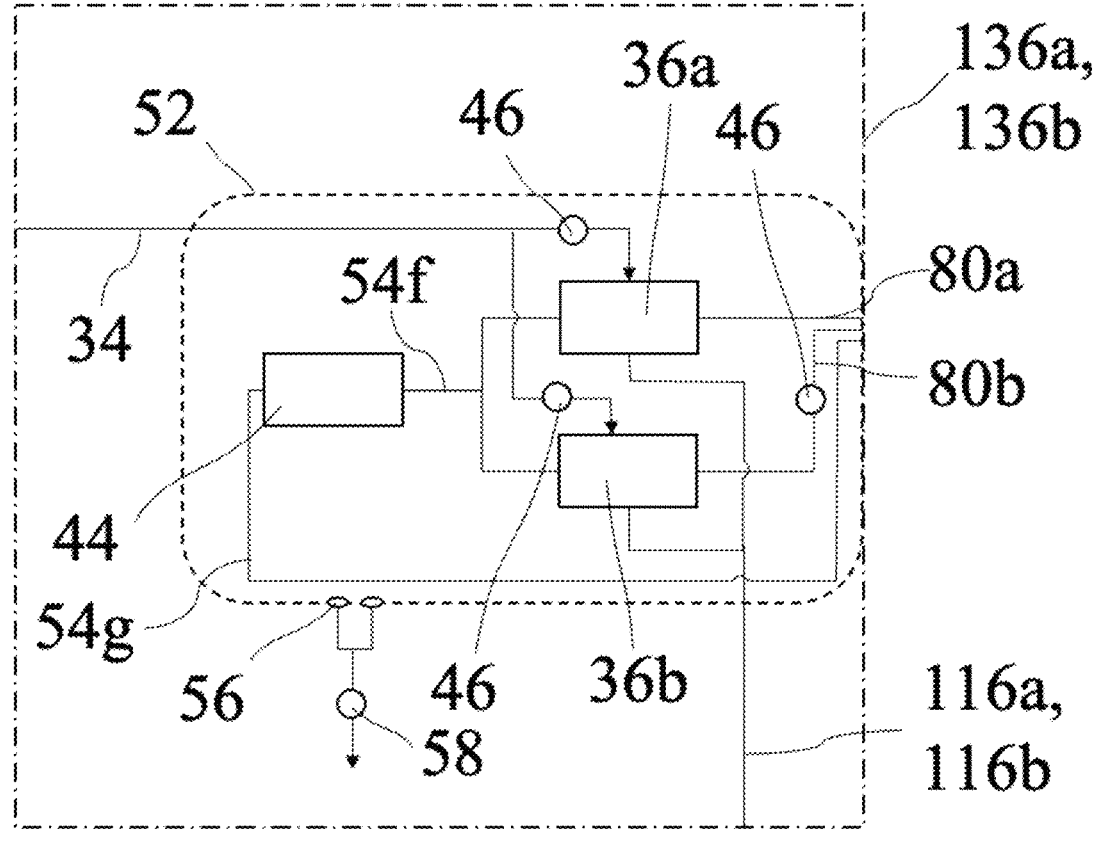
FIG. 5C schematically illustrates a part of the cooling architecture of the cryogenic and superconducting powertrain operating at cryogenic temperature according to FIG. 5A.

Second Configuration of the Cryogenic and Superconducting Powertrain:

In a second configuration, FIG. 5A-5C show a cryogenic and superconducting powertrain 10 with two superconducting motors 12 with two electrical channels each, along with cross-links for the two cooling loops. FIG. 5B represents a box "motor assembly" 112$a$, 112$b$. FIG. 5C represents a box "heat exchanger assembly" 136$a$, 136$b$. In order to increase the redundancy, the powertrain 10 comprises two superconducting motors 12 with two parallel electrical channels for each superconducting motor 12, and two cooling architectures 30. The two cooling architectures 30 are independent one from the other, but with cross-links between them in order to be able to continue to cool both superconducting motors 12 in case of a failure (of a fan 44 or a valve 46 for instance) or of LH$_2$ flow reduction (due to a fuel cell 22 failure).

In a nominal situation, cold H2 (coming from the H2 tank 32 through the LH$_2$ line 34) entering the first "cold" box 74$a$ (first cryostat) is used to cool He in the first heat exchanger assembly 136$a$. H2 at an intermediate temperature results. Then, H2 at an intermediate temperature (on the H2 line 116$a$) is used to cool the TMS 60 coolant in the heat exchanger 62$a$. Resulting warm H2 is then used to feed the fuel cell 22 of the first motor assembly 112$a$ passing through a manifold 68 and PGM 72, and via the H2 line 114.

Cold H2 (coming from the H2 tank 32) entering the second "cold" box 74$b$ (second cryostat) is used to cool He in the second heat exchanger assembly 136$b$. H2 at an intermediate temperature results. Then, H2 at an intermediate temperature (on the H2 line 116$b$) is used to cool the TMS 60 coolant in the heat exchanger 62$b$. Resulting warm H2 is then used to feed the fuel cell 22 of the second motor assembly 112$b$.

In a degraded mode, in case of failure on a H2 line, warm H2 from either the first or second "cold" box 74$a$, 74$b$ can be used to feed the fuel cell 22 of the first motor assembly 112$a$ and the fuel cell 22 of the second motor assembly 122$b$. Indeed, cross-links 76$a$, 76$b$ are arranged on the H2 circulation pipes 70$a$-$d$ between the manifold 68 of the "cold" boxes 74$a$, 74$b$ and the PGMs 72. More precisely, H2 circulation pipes 70$a$, 70$b$ between the first "cold" box 74$a$ and the PGMs 72 connected to the first motor assembly 112$a$ comprise branching 76$a$, 76$b$ to the H2 circulation pipes 70$c$, 70$d$ between the second "cold" box 74$b$ and the PGMs 72 connected to the second motor assembly 112$b$.

In a degraded mode, in case of failure on a He line, He from either the first or second heat exchanger assembly 136$a$, 136$b$ can be used to cool the first motor assembly 112$a$ and the second motor assembly 112$b$. Indeed, cross-links 78$a$-$c$ are arranged on the He circulation pipes 80$a$-$b$ between the heat exchanger assemblies and the motor assemblies. More precisely, He circulation pipes between the first heat exchanger assembly and the first motor assembly comprise branching to the He circulation pipes between the second heat exchanger assembly and the second motor assembly.

Third Configuration of the Cryogenic and Superconducting Powertrain:

In a third configuration (not shown in the Figs.), the powertrain comprises two superconducting motors with one electrical channel per superconducting motor, and two cooling architectures, with cross-links between the two cooling loops, to be able to use each cooling loop for both motors in a degraded mode.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cryogenic and superconducting powertrain comprising:
   at least one superconducting e-motor including a motor shaft,
   at least one motor control unit configured to control functioning aspects of the at least one superconducting e-motor,
   a propeller lead by the at least one superconducting e-motor,
   a gearbox, arranged between the at least one superconducting e-motor and the propeller, and configured to control a rotating speed of the motor shaft,
   at least a superconducting distribution and protection device,
   at least a fuel cell, which comprises a DC power supply, main current leads to the fuel cell,
   at least a DC/DC converter to adapt voltage levels between the superconducting distribution and protection device and the main current leads, wherein the main current leads and the superconducting distribution and protection device have different working voltage levels,
   a Thermal Management System for managing a temperature of the fuel cell, and,
   a cooling architecture comprising:
      a liquid hydrogen (LH$_2$) tank for LH$_2$ storage at cryogenic temperature,
      LH$_2$ circulation pipes starting and ending at the LH$_2$ tank,
      a first heat exchanger configured to exchange heat between a first fluid and a second fluid,
      a first cryostat of second fluid for cooling the motor control unit and the at least one superconducting e-motor,
      a second cryostat of second fluid for cooling the DC/DC converter, and
      second fluid circulation pipes, starting and ending at each cryostat.

2. The cryogenic and superconducting powertrain according to claim 1, wherein the first fluid comprises LH$_2$ and the second fluid comprises gaseous helium (GHe).

3. The cryogenic and superconducting powertrain according to claim 1, wherein the cooling architecture comprises a primary cooling loop for the first fluid and a secondary cooling loop for the second fluid.

4. The cryogenic and superconducting powertrain according to claim 3, wherein the secondary cooling loop is arranged and configured to cool down the cryogenic and superconducting powertrain components.

5. The cryogenic and superconducting powertrain according to claim 4, wherein the secondary cooling loop is cooled by LH$_2$ flow, and in return heats the LH$_2$ that will enter in the fuel cell.

6. The cryogenic and superconducting powertrain according to claim 1, further comprising:
   a cryogenic recirculation fan configured to recirculate the second fluid into the cryogenic and superconducting powertrain components in a complete closed loop, and
   cryogenic insulated lines configured to convey cryogenic fluid to electrical components of the cryogenic and superconducting powertrain.

7. The cryogenic and superconducting powertrain according to claim 1, wherein the cooling architecture further comprises a second heat exchanger configured to exchange heat between the first fluid and the second fluid.

8. The cryogenic and superconducting powertrain according to claim 1, wherein the cooling architecture further comprises a third heat exchanger configured to exchange heat between the first fluid and a third fluid, the third fluid being a coolant of the Thermal Management System.

9. The cryogenic and superconducting powertrain according to claim 8, wherein the cooling architecture further comprises a third cryostat of second fluid for cooling the third heat exchanger.

10. The cryogenic and superconducting powertrain according to claim 8, wherein the third heat exchanger is configured to exchange heat between the first fluid of the first heat exchanger and the third fluid, and
   wherein the cooling architecture further comprises a second heat exchanger configured to exchange heat between the first fluid and the second fluid, and a fourth heat exchanger configured to exchange heat between the first fluid of the second heat exchanger and the third fluid.

11. The cryogenic and superconducting powertrain according to claim 10, wherein the cooling architecture further comprises a fourth cryostat of second fluid for cooling the third heat exchanger.

12. The cryogenic and superconducting powertrain according to claim 6, wherein the cooling architecture further comprises a fifth cryostat of second fluid for cooling the cryogenic recirculation fan and a heat exchanger.

13. The cryogenic and superconducting powertrain according to claim 6, wherein the second cryostat of second fluid is further arranged for cooling the main current leads.

14. The cryogenic and superconducting powertrain according to claim 1, wherein the cooling architecture further comprises a sixth cryostat of second fluid for cooling the superconducting distribution and protection device.

15. A method for managing a cooling temperature of the cryogenic and superconducting powertrain components of the cryogenic and superconducting powertrain according to claim 1, the method comprising the steps of:
   determining limiting parameters of each component of the cryogenic and superconducting powertrain, said limiting parameters being a maximum allowable temperature, or a maximum temperature gradient, or both of each component of the cryogenic and superconducting powertrain,
   calculating a flow and temperature of a fluid passing through the at least one superconducting e-motor which is necessary to respect the limiting parameters of the at least one superconducting e-motor, and
   adjusting the flow and temperature of a fluid circulating through the whole cryogenic and superconducting powertrain which is necessary to respect the other limiting parameters, knowing the flow and temperature of said fluid through the at least one superconducting e-motor.

* * * * *